United States Patent Office 3,639,437
Patented Feb. 1, 1972

---

3,639,437
PRODUCTION OF CARBOXYLIC ESTERS OF β-FORMYLCROTYL ALCOHOL
Roman Fischer and Horst Pommer, Ludwigshafen (Rhine), Germany, assignors to Badische Anilin- & Soda-Fabrik Aktiengesellschaft, Ludwigshafen (Rhine), Germany
No Drawing. Filed July 31, 1968, Ser. No. 748,911
Claims priority, application Germany, Aug. 8, 1967,
P 12 97 597.2–42
Int. Cl. C07c *67/00;* C11c *3/14*
U.S. Cl. 260—405.6
6 Claims

ABSTRACT OF THE DISCLOSURE

A process for the production of carboxylic esters of β-formylcrotyl alcohol in which a carboxylic ester of 2-formyl-2-hydroxybutene-(3) or an acetal or acylate of the same is rearranged in the presence of metallic copper or a copper (I) or copper (II) compound or a mixture of the same with or without hydrolysis of the products obtained.

---

This invention relates to a process for the production of carboxylic esters of β-formylacrotyl alcohol by rearrangement of carboxylic esters of 2-formyl-2-hydroxybutene-(3) or an acetal or acylate thereof.

Carboxylic esters of β-formylcrotyl alcohol have great industrial importance because they can serve for example as starting materials for the synthesis of vitamin A and its derivatives.

It is known from U.S. patent specification No. 3,347,930 and U.S. patent application 390,714 filed on Aug. 19, 1964 that carboxylic esters of β-formylcrotyl alcohol can be prepared by reacting 2-formyl-2-hydroxybutene-(3) or an acetal or acylate thereof with thionyl chloride or phosgene in the presence of N,N-dialkyl substituted amides or tertiary amines to form omega-chlorotiglaldehyde or an acetal or acylate of the same which is then converted by reaction with the alkali metal salt of a carboxylic acid into the corresponding ester of β-formylcrotyl alcohol.

It is an object of this invention to provide a process for the production of carboxylic esters of β-formylcrotyl alcohol according to which these compounds are obtained by a simpler method than by the known methods. Another object of the invention is to provide a process in which the starting materials are accessible more easily and in higher yields.

In accordance with this invention, these and other objects and advantages are achieved in a process for the production of carboxylic esters of β-formylcrotyl alcohol in which a carboxylic ester of 2-formyl-2-hydroxybutene-(3) or an acetal or acylate of the same is rearranged in the presence of metallic copper or a copper (I) or copper (II) compound or a mixture of the same with or without subsequent hydrolysis of the product obtained.

The following equation reproduces for example the reaction of 1,1-dimethoxy-2-methyl-2-acetoxybutene-(3) to form β-formylcrotyl acetate:

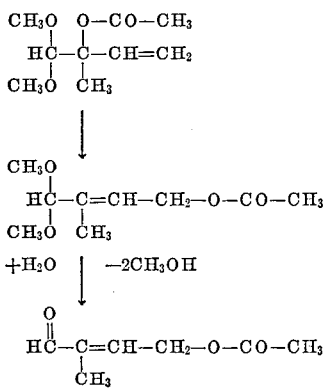

The new process makes it possible to produce the desired products in a much simpler way than in the prior art processes. Good yields are obtained. The starting materials for the process of the invention may generally b prepared more simply and in higher yields than the starting compounds for the prior art processes.

The starting materials for the process according to this invention may be prepared in the conventional way by acylation of 2-formyl-2-hydroxybutene-(3) or an acetal or acylate thereof with a halide or anhydride of a suitable carboxylic acid. The starting materials may also be obtained by acylation of 2-formyl-2-hydroxybutene-(3) or an acetal or acylate thereof followed by partial hydrogenation of the ester.

The ester group in the starting materials may for example be based on aliphatic, cycloaliphatic, araliphatic or aromatic carboxylic acids which in general have one to eighteen carbon atoms and may also bear inert substituents such as lower alkoxy groups or halogen atoms for example chlorine or bromine atoms. It is preferred to use starting materials whose ester groups have been derived from aliphatic carboxylic acids having one to four carbon atoms. Examples of carboxylic acids on which the ester groups may be based are hexahydrobenzoic acid, acetic acid, propionic acid, β-chloropropionic acid, benzoic acid and palmitic acid.

The starting materials may be carboxylic esters of 2-formyl-2-hydroxybutene-(3) itself or an acetal or acylate thereof; it is preferred to use acetals.

Among the acetals those are preferred which are derived from aliphatic alcohols having one to four carbon atoms such as methyl alcohol, ethyl alcohol and isopropyl alcohol. Those acylates are preferred which are based on aliphatic carboxylic acids having one to four carbon atoms.

Examples of starting materials which may be used for the process according to this invention are:

1,1-dimethoxy-2-methyl-2-acetoxybutene-(3),
1,1-diethoxy-2-methyl-2-acetoxybutene-(3),
1,1-di-n-butoxy-2-methyl-2-acetoxybutene-(3),
1,1-dimethoxy-2-methyl-2-benzoyloxybutene-(3),
2-(phenylacetoxy)-2-formylbutene-(3),
1,1-di-acetoxy-2-methyl-(chloroacetoxy)-butene-(3), It is preferred to use 1,1-dimethoxy-2-methyl-2-acetoxybutene-(3) and 1,1 - diethoxy-2-methyl-2-acetoxybutene-(3) for economic reasons.

Metallic copper or copper (I) or copper (II) compounds or mixtures of the same may be used as catalysts for the rearrangement; the copper compounds may be organic or inorganic, the nature of the anion in the copper salts not being critical. Metallic copper may be used for example in the form of plates, wires and turnings. It is preferable to use it in finely divided form, for example as a powder. Examples of suitable copper (I) or copper (II) compounds are copper (I) chloride, copper (I) bromide, copper (II) sulfate ($CuSO_4$ or $CuSO_4 \cdot 5H_2O$), copper (II) bromide, copper (II) acetate, copper (II) oxide and copper (II) hydroxide. The catalysts may be used as such or on an inert carrier material. The amount of catalyst may vary within wide limits. The catalyst is generally used in amounts (calculated as copper) of 0.005 to 15% by weight, preferably 0.01 to 1% by weight, with reference to the starting material.

Temperatures of from 50° to 250° C. are generally chosen for the reaction; those between 110° and 180° C. are preferred. The reaction proceeds very slowly at low temperatures. At temperatures above 250° C. there is a risk of decomposition products being formed. The reaction is advantageously carried out at atmospheric pressure. It is however also possible to use superatmospheric pressure, for example when the reaction is to be carried out at a temperature above the boiling point of the reaction mixture, or subatmospheric pressure, for example 700 mm. Hg. The process according to the invention may be carried out continuously or batchwise.

The starting materials may be used as such or together with inert solvents for the process according to this invention. Preferred solvents are aliphatic or aromatic hydrocarbons, aliphatic or cyclic ethers, lower aliphatic carboxylic acids, and amides. Examples are: n-hexane, n-octane, hydrocarbons from petroleum, for example having a boiling range of from 80° to 150° C., cyclohexane, benzene, toluene, xylene, ethylbenzene, di-n-butyl ether, tetrahydrofuran, dioxane, ethylene glycol dimethyl ether, formic acid, acetic acid, N-methylpyrrolidone and dimethyl formamide.

When carboxylic esters of 2-formyl-2-hydroxybutene-(3) are used as starting materials, carboxylic esters of β-formylcrotyl alcohol are obtained after the rearrangement. When the corresponding acetals or acylates are used as starting materials however, acetals or acylates of carboxylic esters of β-formylcrotyl alcohol are obtained as rearrangement products which are then converted into the end products by hydrolysis in a conventional manner. For this purpose the acetals or acylates which have been rearranged may be isolated and then hydrolyzed in a second operation. It is however advantageous to convert the rearranged acetals or acylates into the end products without isolation in the same reactor.

Dilute aqueous mineral acids such as hydrochloric acid, phosphoric acid, sulfuric acid or nitric acid in a concentration of for example 1% by weight may be used for the hydrolysis. It is advantageous however to carry out the hydrolysis in a neutral pH range with the addition of water. The temperature used in hydrolysis is preferably 40° to 80° C.

The rearrangement reaction generally takes two to six hours depending on the temperature. The duration of the hydrolysis of rearranged acetals or acylates is generally from thirty minutes to two hours depending on the temperature and the pH value.

The process may be carried out for example by heating the starting material together with the catalyst, with or without an inert solvent, to the reaction temperature for example in a stirred vessel. When rearrangement is over, hydrolysis is carried out if necessary. The hydrolysis may be carried out for example by adding water to the reaction mixture obtained, in the same stirred vessel, and keeping the mixture for some time, for example thirty minutes, at hydrolysis temperature. The resulting carboxylic ester of β-formylcrotyl alcohol contained in the organic phase is worked up by distillation or recrystallization.

The invention is illustrated by the following examples, in which parts are by weight.

EXAMPLE 1

100 parts of 1,1-dimethoxy-2-methyl-2-acetoxybutene-(3) and 0.25 part of copper powder are heated for four hours at 140° to 145° C. while stirring. 100 parts of water is added to the reaction mixture and the whole is stirred for forty-five minutes at 50° to 60° C. The organic phase is separated and the aqueous phase is extracted with a small amount of chloroform. The combined organic phases are washed with sodium hydrogen carbonate solution, dried and distilled. 54 g. (71.5% of the theory) of β-formylcrotyl acetate is obtained having a boiling point at 0.3 mm. Hg of 50° to 55° C.

EXAMPLE 2

100 parts of 1,1-dimethoxy-2-methyl-2-acetoxybutene-(3) and 0.5 part of copper(II) oxide are heated at 160° C. for four hours. Then 150 parts of water is added and the reaction mixture is heated for thirty minutes at 55° C. After processing analogously to Example 1, 51 g. of β-formylcrotyl acetate (67.5% of the theory) is obtained.

EXAMPLE 3

100 parts of 1,1-dimethoxy-2-methyl-2-acetoxybutene-(3), 50 parts of glacial acetic acid and 0.5 part of copper acetate are heated for four hours at 130° to 140° C. 200 parts of water is then added and the reaction mixture is allowed to stand for thirty minutes. 55 g. of β-formylcrotyl acetate is obtained (72.8% of the theory).

EXAMPLE 4

100 parts of 1,1-dimethoxy-2-methyl-2-acetoxybutene-(3) and 10 parts of copper powder are heated at 140° to 145° C. for three hours while stirring. The reaction mixture is then filtered off from the copper powder and the latter is washed with a small amount of chloroform. The copper powder is advantageously used again for the reaction. The combined filtrates are worked up as described in Example 1. 53 g. (70.3% of the theory) of β-formylcrotyl acetate is obtained.

We claim:

1. A process for production of carboxylic acid esters of β-formylcrotyl alcohol which comprises molecularly rearranging a carboxylic acid ester of an alkane monocarboxylic acid having 1–18 carbon atoms, hexahydrobenzoic acid, benzoic acid or one of said acids bearing lower alkoxy, chloro or bromo substituents, and 2-formyl-2-hydroxybutene-(3), an acetal thereof derived from an alkanol having 1–4 carbon atoms, or an acylate thereof, the acyl groups of which are those of a saturated, aliphatic carboxylic acid having 1–4 carbon atoms, in the presence of a catalytic amount of metallic copper, a copper (I) salt, a copper(II) salt, or copper(II) oxide.

2. A process as claimed in claim 1 wherein the catalyst is metallic copper.

3. A process as claimed in claim 1 wherein the catalyst is copper(I) chloride, copper(I) bromide, copper(II) sulfate, copper(II) bromide, copper(II) acetate, copper (II) oxide or copper(II) hydroxide.

4. A process as claimed in claim 1 wherein the rearrangement is carried out at a temperature of from 50° to 250° C.

5. A process as claimed in claim 1 wherein said carboxylic acid ester is said acetal, and hydrolyzing the resultant acetal of the carboxylic acid ester of β-formylcrotyl alcohol to obtain said carboxylic acid ester.

6. A process as claimed in claim 1 wherein said carboxylic acid ester is said acylate, and hydrolyzing the resultant acylate of the carboxylic acid ester of β-formylcrotyl alcohol to obtain said carboxylic acid ester.

References Cited

UNITED STATES PATENTS

| | | | |
|---|---|---|---|
| 2,451,739 | 10/1948 | Isler | 260—491 |
| 3,211,780 | 10/1965 | Marbet et al. | 260—491 |

LORRAINE A. WEINBERGER, Primary Examiner

V. GARNER, Assistant Examiner

U.S. Cl. X.R.

260—408, 468 R, 473 R, 476 R, 484 R, 487, 488 H, 491, 494, 496